United States Patent
Park

(10) Patent No.: US 10,146,736 B2
(45) Date of Patent: Dec. 4, 2018

(54) PRESENTING PIPELINES OF MULTICORE PROCESSORS AS SEPARATE PROCESSOR CORES TO A PROGRAMMING FRAMEWORK

(71) Applicant: Imagination Technologies Limited, Kings Langley (GB)

(72) Inventor: Jung-Wook Park, Seoul (KR)

(73) Assignee: Imagination Technologies Limited, Kings Langley (GB)

( * ) Notice: Subject to any disclaimer, the term of this patent is extended or adjusted under 35 U.S.C. 154(b) by 241 days.

(21) Appl. No.: 14/858,459

(22) Filed: Sep. 18, 2015

(65) Prior Publication Data
US 2016/0085719 A1    Mar. 24, 2016

(30) Foreign Application Priority Data
Sep. 19, 2014   (GB) ................... 1416578.1

(51) Int. Cl.
*G06F 9/44*    (2018.01)
*G06F 15/78*   (2006.01)
*G06F 9/50*    (2006.01)
*G06F 9/38*    (2018.01)
*G06F 8/41*    (2018.01)

(52) U.S. Cl.
CPC ........... *G06F 15/7828* (2013.01); *G06F 8/45* (2013.01); *G06F 9/3867* (2013.01); *G06F 9/5061* (2013.01); *G06F 9/5077* (2013.01)

(58) Field of Classification Search
None
See application file for complete search history.

(56) References Cited

U.S. PATENT DOCUMENTS

| | | |
|---|---|---|
| 7,802,073 B1 | 9/2010 | Cheng et al. |
| 2003/0135716 A1 | 7/2003 | Vinitzky |
| 2012/0084777 A1 | 4/2012 | Jayamohan |
| 2012/0291040 A1* | 11/2012 | Breternitz ............. G06F 9/5083 718/104 |
| 2013/0036409 A1* | 2/2013 | Auerbach ............... G06F 8/456 717/140 |

FOREIGN PATENT DOCUMENTS

EP        2466460 A1    6/2012

* cited by examiner

*Primary Examiner* — Corey S Faherty
(74) *Attorney, Agent, or Firm* — Vorys, Sater, Seymour and Pease LLP; Vincent M DeLuca

(57) ABSTRACT

A data processing system comprising: a processor comprising a plurality of cores, each core comprising a first processing pipeline and a second processing pipeline, the second processing pipeline having a different architecture to the first processing pipeline; a framework configured to manage the processing resources of the data processing system including the processor; and an interface configured to present to the framework each of the processing pipelines as a core.

20 Claims, 4 Drawing Sheets

PRESENTING PIPELINES OF MULTICORE PROCESSORS AS SEPARATE PROCESSOR CORES TO A PROGRAMMING FRAMEWORK

BACKGROUND OF THE INVENTION

This invention relates to efficient utilisation of processor resources.

Processor designers are continually striving to improve processor performance, designing processor architectures that provide, for example, increased computational abilities, increased operating speeds, reduced power consumption, and/or reduced cost. With many previous processor architectures, it has become increasingly difficult to improve processor performance by increasing their operating frequency. As a result, many newer processor architectures have focused on parallel processing to improve performance.

One parallel processing technique employed in processor architectures is to provide multiple processing cores. This technique utilises multiple independent processors, referred to as cores, operating in parallel to execute programs. Typically, multiple processing cores share a common interface and may share other peripheral resources. Each core may have further parallel processing capabilities. For example, a core may have multithreading, superscalar, single instruction multiple data (SIMD), multiple instruction multiple data (MIMD), very long instruction word (VLIW) and/or other parallel processing capabilities.

Each core can be provided with different types of processing elements that are configured to process data in different ways. For example, a core may comprise a set of main processing elements that are optimised for processing scalar operations and another set of auxiliary processing elements (e.g. a SIMD pipeline) that are optimised for vector operations.

In SIMD processing, multiple processing elements execute the same instructions at the same time but with different data. Thus SIMD processing is particularly efficient for routines that repeat identical sequences of code multiple times for different datasets. Such routines may be, for example, for adjusting the contrast in a digital image.

A computer can comprise a number of different types of processors (e.g. CPUs, GPUs, DSPs, FGPAs, etc.) with parallel processing capabilities. Frameworks, such as OpenCL and CUDA, allow programmers to write programs that are capable of being executed across the different types of processor. In some situations, under the structure provided by the framework, the processing capacity can be underutilised when executing programs. Thus, there is a need for better management of available processing capacity so that the programs can be more efficiently processed.

BRIEF SUMMARY OF THE INVENTION

According to a first aspect of the disclosure there is provided a data processing system including a processor having a plurality of cores, each core comprising a first processing pipeline and a second processing pipeline, the second processing pipeline having a different architecture than the first processing pipeline; a framework configured to manage the processing resources of the data processing system including the processor; and an interface configured to present to the framework each of the processing pipelines as a core.

The interface may be further configured to present to the framework the processor as two different processors.

The interface may be configured to present to the framework the first processing pipelines as cores in one processor of the two different processors and the second processing pipelines as cores in the other processor of the two different processors.

The framework may be configured to query the data processing system to determine the number of processors within the data processing system and the interface may be configured to respond to the query, the response indicating two different processors so as to present the processor as two different processors.

The interface may be configured to present to the framework each processing pipeline as a core in the processor.

The framework may be configured to query the processor to determine the number of cores comprised within the processor and the interface is configured to respond to the query, the response indicating the number of processing pipelines comprised within the processor so as to present each processing pipeline as a core.

The second processing pipeline may be a single instruction multiple data (SIMD) processing pipeline.

The data processing system may further comprise a scheduler configured to access memory comprising a first set of instructions and a second set of instructions and to cause the first set of instructions to be executed at the first processing pipeline and the second set of instructions to be executed at the second processing pipeline.

The first and second set of instructions may be compiled from the same program code.

The data processing system may further comprise a compiler configured to compile the program into the first set of instructions and to compile the same program into the second set of instructions.

The first set of instructions may be compiled from the program so as to be suitable for processing at the first processing pipeline and the second set of instructions may be compiled from the same program so as to be suitable for processing at the second processing pipeline.

The first set of instructions may be compiled from a first program and the second set of instructions may be compiled from a second, different, program.

The first set of instructions may be different to second set of instructions.

The first and second sets of instructions may be compiled in accordance with the OpenCL standard.

The framework may be configured to operate in accordance with the OpenCL standard.

The processor may be a simultaneous multi-threading processor.

The first processing pipeline may have a very long instruction word (VLIW) and/or superscalar architecture.

According to a second aspect of the disclosure there is provided a method for a data processing system including a processor having a plurality of cores, each core comprising a first processing pipeline and a second processing pipeline, the second processing pipeline having a different architecture than the first processing pipeline, the method comprising: managing, at a framework, the processing resources of the data processing system including the processor; and presenting to the framework each of the processing pipelines as a core.

The method may further comprise presenting to the framework the processor as two different processors.

The method may further comprise presenting to the framework each processing pipeline as a core in the processor.

According to a third aspect of the disclosure there is provided a machine readable storage medium having encoded thereon non-transitory machine readable code for generating the data processing system described above.

BRIEF DESCRIPTION OF THE DRAWINGS

The present invention will now be described by way of example with reference to the accompanying drawings. In the drawings.

DETAILED DESCRIPTION

The following description is presented by way of example to enable any person skilled in the art to make and use the invention. The present invention is not limited to the embodiments described herein and various modifications to the disclosed embodiments will be readily apparent to those skilled in the art.

Figure 1:
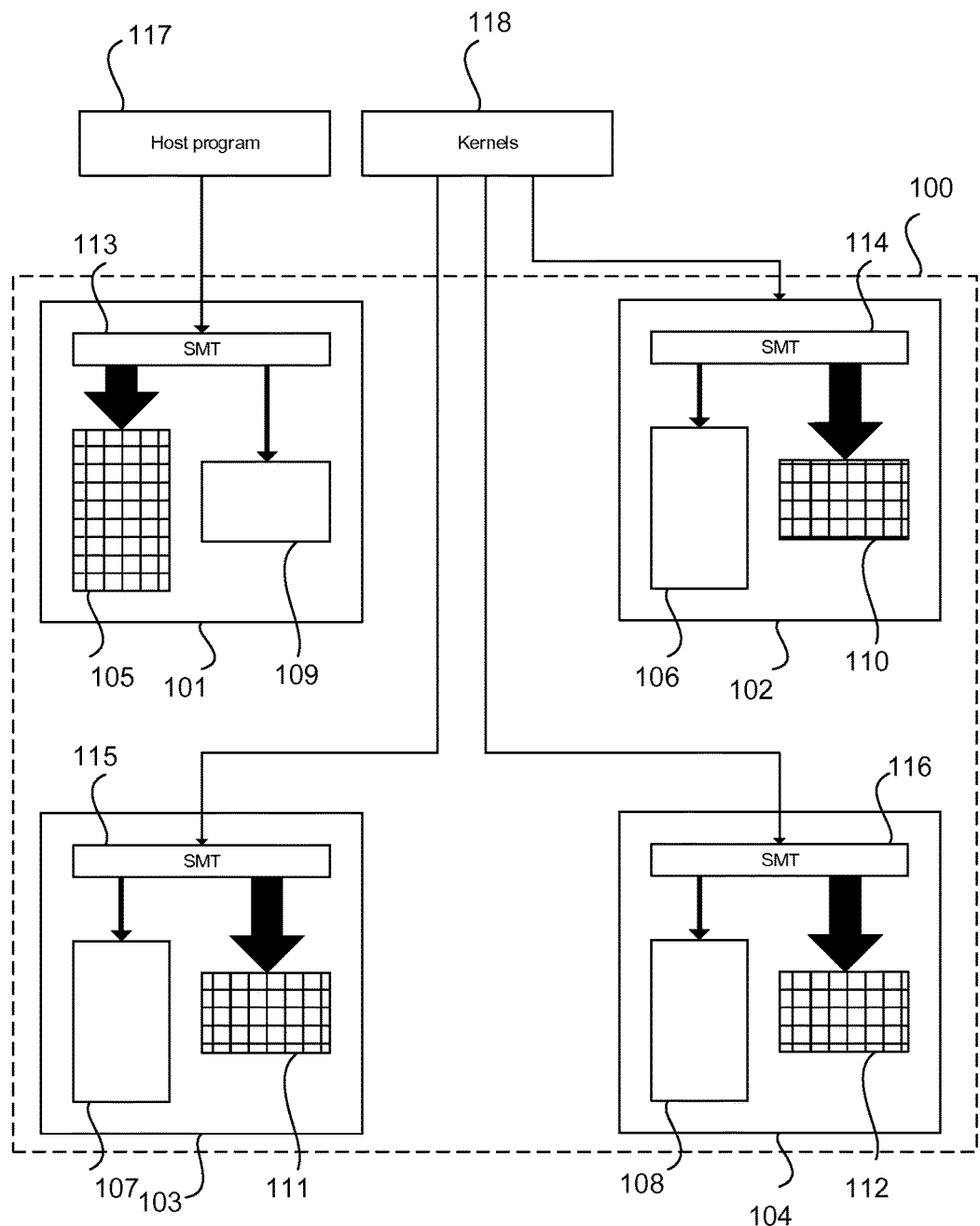
FIG. 1 shows a processor processing kernels.

FIG. 1 is a schematic diagram of a processor 100 that contains four cores 101, 102, 103 and 104. Each core has a main processing pipeline 105, 106, 107 and 108 respectively and a SIMD processing pipeline 109, 110, 111 and 112 respectively. The main processing pipeline for each core 105, 106, 107 and 108 may be carried out at a set of processing elements that are capable of carrying out scalar operations (e.g. superscalar, VLIW, etc. processors). The SIMD processing pipeline 109, 110, 111 and 112 for each core may be carried out at a set of processing elements that are optimised for SIMD processing of vector operations.

Each core also comprises front-end logic which is configured to fetch and issue instructions so that multiple instructions from multiple threads can be issued to the processing elements at each cycle. This is known as simultaneous multi-threading (SMT). FIG. 1 depicts this front-end logic as SMT engines 113, 114, 115 and 116 which distribute instructions to the appropriate pipeline. In the case of vector operations, the SMT engine for each core can distribute instructions to the SIMD pipeline or the main pipeline. For scalar operations and some vector operations, the SMT engine distributes the instructions to the main pipeline.

As part of the OpenCL framework, a host program is required to run at a processor in order to distribute instructions or kernels that are to be executed. The host program is shown at 117 being implemented at core 101. Generally, the host program is designed to be a sequential routine which includes scalar operations and thus most of the instructions of the host program are carried out at the main pipeline 105. The host program 117 may have a relatively small amount of SIMD instructions, which could be distributed to SIMD pipeline 109 by the SMT engine 113. Thus, the SIMD pipeline 109 of core 101 will mostly be idle and underutilised.

The host program 117 distributes kernels 118 to the remaining cores 102, 103 and 104. These kernels may comprise scalar or vector operations or a mixture of the two. Generally, to increase the speed in processing programs, the programs would be compiled so that a relatively large amount of the processing can be done in parallel. Thus, when the kernels are received at the SMT engines 114, 115 and 116, they would distribute most of the parallel processing work to the SIMD pipelines 110, 111 and 112 respectively. This, however, causes the main pipelines 106, 107 and 108 to be idle for a significant amount of time.

Thus, as shown in FIG. 1, the SIMD pipeline 109 of core 101 and the main pipelines 106, 107 and 108 of cores 102, 103 and 104 respectively are idle for a significant amount of time as a relatively small amount of instructions are provided to those pipelines by their respective SMT engines.

Figure 2:
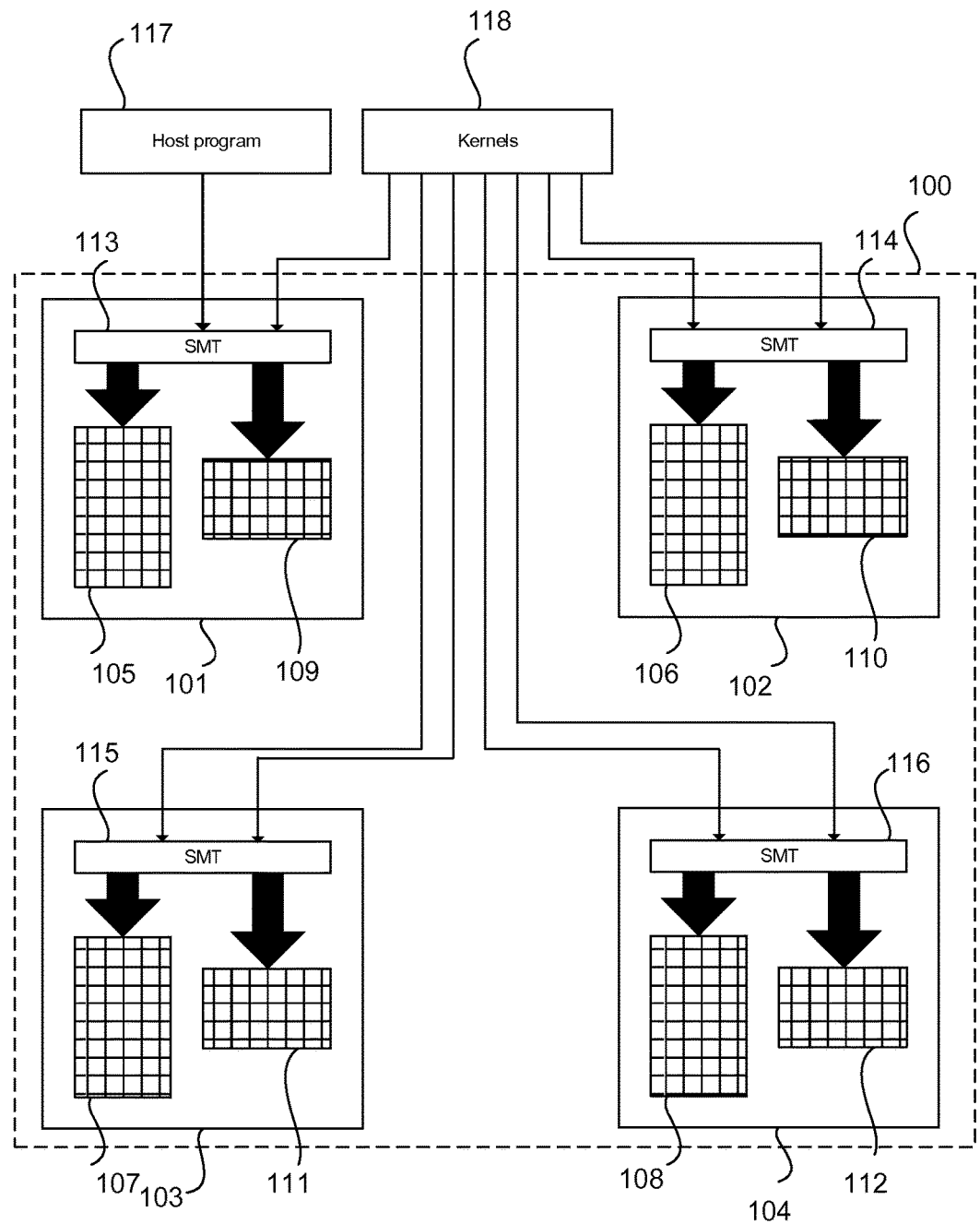
FIG. 2 shows a processor processing kernels in a more efficient manner.

FIG. 2 shows a schematic diagram of the processor 100 of FIG. 1 being utilised in a more efficient manner. The host program 117 is run on the main pipeline 105 of core 101 as before. However, in this example, the host 117 is able to treat each of the other pipelines (main and SIMD) as an independent core. Thus, the host 117 can concurrently distribute two kernels to each of cores 102, 103 and 104 and one kernel to core 101. The SMT engine at each core is then able to distribute instructions from each received kernel to the main and SIMD pipelines. This provides for more efficient utilisation of all of the available pipelines of processor 100.

In one example, to allow the host program 117 to treat each pipeline as an independent core, an interface at the processor or between the processor and the OpenCL framework is provided. The interface can present, to the OpenCL framework, that the processor 100 has eight cores instead of the four it actually has. The interface may be the driver for the processor 100 which is programmed to return the number of pipelines that the processor has rather than the number of cores it has. Alternatively, the interface may be a program that is configured to intercept queries from the OpenCL framework destined for the processor 100 and respond to the query as if the response was from the processor 100. The response indicates the number of pipelines the processer 100 has instead of the number of cores. In either case, the interface can respond to a query (such as the clGetDeviceInfo query provided in the OpenCL standard) that requests information about the number of compute units (which can be considered to be number of cores) on the processor.

Alternatively, the interface can present, to the OpenCL framework, the processor 100 as two virtual processors, each with four cores (i.e., in OpenCL terminology, two compute devices, each having four compute units). The first virtual processor may be presented as having four cores, each core having the capabilities of a main pipeline and second virtual processor may be presented as having four cores, each having the capabilities of a SIMD pipeline. Thus the OpenCL framework is presented with a total of eight cores instead of the four cores of the processor 100. When the OpenCL framework queries for a list of available devices (for example, using the clGetDeviceIDs query), the interface can respond to the query to return details of the two virtual processors instead of processor 100. Each virtual processor may have its own address and device capability characteristics. Each virtual processor can process the same program, which may be compiled into two different versions (as described below) suitable for each virtual processor. The virtual processors could also concurrently process a different program at each virtual processor.

By indicating to the OpenCL framework n number of pipelines instead of the m number of cores it actually has, programs can be compiled into instructions and provided to the processor as if the processor had n cores. If the host program is run on one of the pipelines of the processor then the host program can concurrently distribute n−1 kernels to the processor for execution at each available pipeline. Thus the host is capable of distributing kernels to the processor as if the processor had n−1 cores available.

The SMT engine for each core appropriately distributes the instructions from each kernel to the main or SIMD pipeline. The instructions are distributed to the main or SIMD pipeline in dependence on the type of processing that is required to be carried out. For example, if the instructions are for vector operations, then the SMT engine may distribute those instructions to the SIMD pipeline for execution. If the instructions are for a scalar operation, then the SMT will distribute those instructions to the main pipeline.

To utilise the parallel processing capacity of the processor 100 even more efficiently, a program that is to be processed can be compiled into two different versions of instructions: a first version for processing at the main pipeline and a second version for processing at the SIMD pipeline. Both versions would output the same result if executed with the same data. The host program distributes both versions to the processor, which appropriately distributes and processes them at their respective main and SIMD pipelines, which may not necessarily be at the same core. Thus, a program can more efficiently be executed because a main and a SIMD pipeline is concurrently used for its execution rather than a single pipeline.

Figure 3:
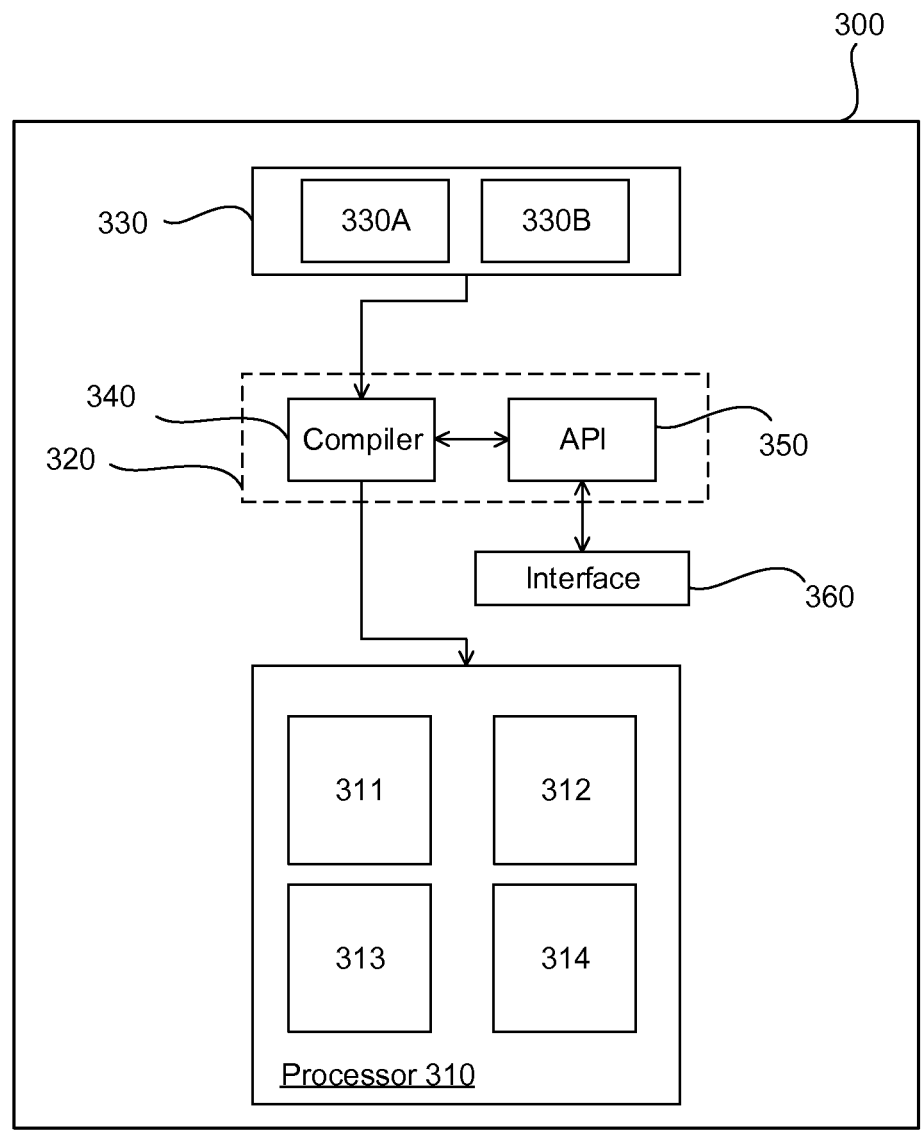
FIG. 3 is a schematic diagram of a data processing system capable of processing a program.

FIG. 3 is a schematic illustration of a data processing system 300 comprising a processor 310 and a framework 320 that enables a program 330 to be executed at the processor 310.

Processor 310 may be a CPU, GPU, a DSP or any other type of processor that is compatible for use within the framework 320. The processor 310 comprises m number of cores, where m is greater than one. In the example of FIG. 3, processor 310 is shown as having four cores 311 to 314. Each core may have one or more pipelines, such as a main pipeline and/or one or more SIMD pipelines, as described above. The total number of pipelines n available at the processor is greater than the number of cores m. As described above, each core may comprise an SMT engine that distributes instructions received at the core to the appropriate pipeline.

The framework 320 comprises a compiler 340 that is capable of reading and compiling program 330. Program 330 may comprise two different sets of code: one for kernels 330A that are to be executed at the processor 310 and another for the host program 330B that will call the kernels. The program 330 is compiled into a sequence of discrete instructions that are capable of being executed at the processor 310.

The host program 330B is compiled by the compiler 340 to be run on a main pipeline, preferably, of the host CPU. The compiler 340 may compile the kernel program 330A into two different sets of instructions to provide two different versions of the same kernel program 330A, as mentioned above. The compiler 340 may directly read the program 330 or indirectly read the program 330 via a translation of the program language into a language readable by the compiler 340. The program 330 may be coded using a programming language such as C, C++, Java, Fortran, etc.

The framework 320 may also comprise an Application Programming Interface (API) 350 for managing the processing of the program 330 at the processor 310. Through the API 350, the processor 310 and other processors (not shown) that may exist at the data processing system 300 can be queried to gather information about the processing resources available at the data processing system 300. This information is then used by the host program (which is compiled from program 330) to distribute work to the processor 310 and any other detected processors.

The data processing system 300 also comprises an interface 360. As described above, the interface 360 may be at the driver for the processor 310 or a program between the API 350 and the processor 310. The interface 360 can respond to queries addressed to the processor 310 to provide to the framework 320 information that presents each pipeline of the processor 310 as a core, as described above.

Figure 4:
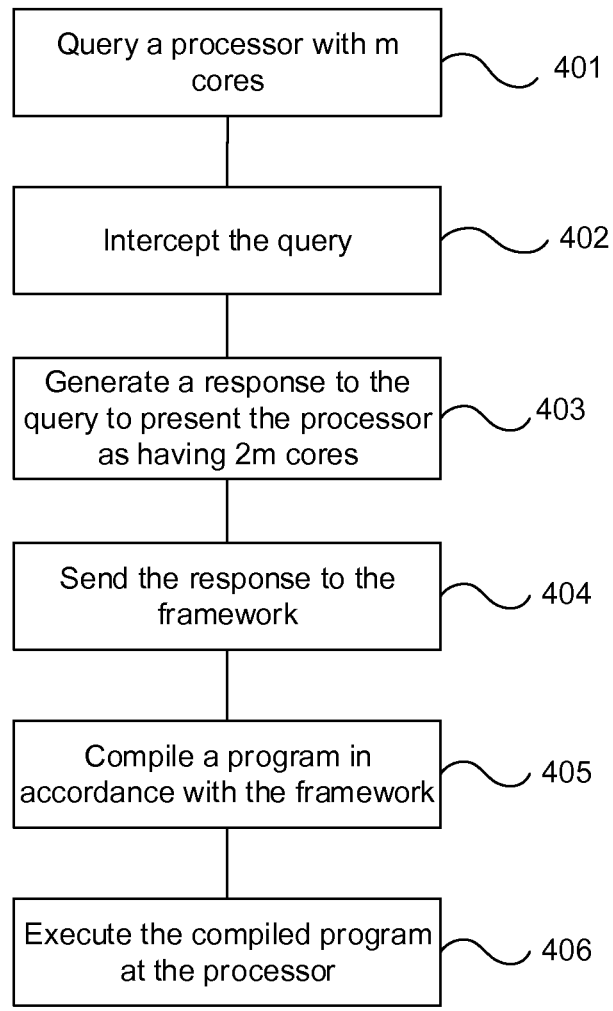
FIG. 4 is a flow diagram for processing a program at a processor.

FIG. 4 is a flow diagram which describes processing instructions (which may be compiled from one or more programs) at a processor having m number of cores, each core having a first processing pipeline and a second, different processing pipeline. In this example, the processor is managed by the OpenCL framework.

At step 401, the OpenCL framework queries the processor determine its processing capabilities. As described above, this may be done by sending a clGetDeviceInfo query and/or a clGetDeviceIDs query.

At step 402, an interface intercepts the query from the framework. At step 403, the interface generates a response to the query. The interface generates the response in dependence on the preferred mechanism of presenting the pipelines as cores.

For example, if the first pipelines and the second pipelines are to be presented as cores in two different virtual processors, then the interface can generate a response to the clGetDeviceIDs query with two different IDs for two virtual processors instead of the single ID for the processor. Then, when the framework later sends a clGetDeviceInfo query for the identified virtual processors, the interface can generate responses that present each virtual processor as having m cores (i.e. a total of 2 m cores for both virtual processors).

Alternatively, if the first pipelines and the second pipelines are to be presented as cores in a single processor, then the interface may forward the clGetDeviceIDs query to the processor without generating a response and allow the processor to respond as normal. The interface then only generates a response to the clGetDeviceInfo query when it is addressed to the processor. The generated response presents that processor as having 2 m cores.

At step 404, the generated response, which presents each pipeline as a core, is sent to the framework.

At step 405, a program is compiled in accordance with the framework. The program is compiled into: a) kernels to be executed and b) a host program to call the kernels.

At step 406, the host program distributes the kernels to the processor as if the processor had 2 m cores or as if the processor was two separate processors each having m cores (i.e. a total of 2 m cores) rather than the m cores that the processer actually has. This allows a greater number of kernels to be executed in parallel and so faster processing of the program can be performed. Further programs may be similarly compiled and executed at steps 405 and 406.

The examples above are described with reference to the OpenCL framework. However, the features and methods described can be implemented with other frameworks, such as CUDA.

The data processing system of FIG. 3 is shown as comprising a number of functional blocks, such as the API 350 and the interface 360. This is a schematic representation for illustration only and is not intended to define a strict division between different logic elements of a data processing system. Each functional block can be provided in any suitable manner.

The terms software and computer readable program code as used herein includes executable code for processors (e.g.

CPUs and/or GPUs), firmware, bytecode, programming language code such as C or OpenCL, and non-transitory modules for reconfigurable logic devices such as FPGAs. Machine-readable code includes software and code for defining hardware representations of integrated circuits at any level, including at register transfer level (RTL), at high-level circuit representations such as Verilog or VHDL, and lower-level representations such as OASIS and GDSII.

The algorithms and methods described herein could be performed by one or more physical processing units executing software that causes the unit(s) to perform the algorithms/methods. The or each physical processing unit could be any suitable processor, such as a CPU or GPU (or a core thereof), or fixed function or programmable hardware. The software could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A data processing system comprising:
a processor having a plurality of cores, each core including at least a first processing pipeline and a second processing pipeline, the second processing pipeline having an architecture that is different from the architecture of the first processing pipeline;
a processing resource manager configured to manage the processing resources of the data processing system including the processor; and
an interface configured to present to the processing resource manager each of the processing pipelines as an individual core.

2. The data processing system according to claim 1, wherein the interface is further configured to present to the processing resource manager the processor as two different processors.

3. The data processing system according to claim 2, wherein the interface is configured to present to the processing resource manager the first processing pipelines as cores in one processor of the two different processors and the second processing pipelines as cores in the other processor of the two different processors.

4. The data processing system according to claim 2, wherein the processing resource manager is configured to query the data processing system to determine the number of processors within the data processing system and the interface is configured to respond to the query by indicating two different processors so as to present to the framework the processor as two different processors.

5. The data processing system according to claim 1, wherein the interface is configured to present to the processing resource manager each processing pipeline as a core in the processor.

6. The data processing system according to claim 5, wherein the processing resource manager is configured to query the processor to determine the number of cores comprised within the processor and the interface is configured to respond to the query by indicating the number of processing pipelines within the processor so as to present to the framework each processing pipeline as a core.

7. The data processing system according to claim 1, wherein the second processing pipeline is a single instruction multiple data (SIMD) processing pipeline.

8. The data processing system according to claim 1, further comprising a scheduler configured to access memory comprising a first set of instructions and a second set of instructions and to cause the first set of instructions to be executed at the first processing pipeline and the second set of instructions to be executed at the second processing pipeline.

9. The data processing system according to claim 8, wherein the first and second set of instructions are compiled from the same program code.

10. The data processing system according to claim 9, further comprising a compiler configured to compile the program into the first set of instructions and to compile the same program into the second set of instructions.

11. The data processing system according to claim 9, wherein the first set of instructions is compiled from the program so as to be suitable for processing at the first processing pipeline and the second set of instructions is compiled from the same program so as to be suitable for processing at the second processing pipeline.

12. The data processing system according to claim 8, wherein the first set of instructions is compiled from a first program and the second set of instructions is compiled from a second, different program.

13. The data processing system according to claim 8, wherein the first set of instructions is different than the second set of instructions.

14. The data processing system according to claim 8, wherein the first and second sets of instructions are compiled in accordance with the OpenCL standard.

15. The data processing system according to claim 1, wherein the processing resource manager is configured to operate in accordance with the OpenCL standard.

16. The data processing system according to claim 1, wherein the processor is a simultaneous multi-threading (SMT) processor.

17. The data processing system according to claim 1, wherein the first processing pipeline has a very long instruction word (VLIW) and/or superscalar architecture.

18. A method for increasing utilisation of pipelines of a processor having a plurality of cores, each core comprising a first processing pipeline and a second processing pipeline, the second processing pipeline having an architecture that is different from an architecture of the first processing pipeline, the method comprising:
managing, at a processing resource manager, the processing resources of a data processing system including the processor; and
presenting to the processing resource manager each of the processing pipelines as an individual core.

19. The method according to claim 18, further comprising presenting to the processing resource manager the processor as two different processors.

20. A non-transitory machine readable storage medium having stored therein computer-executable instructions that, when executed at a data processing system including a processor having a plurality of cores, each core comprising a first processing pipeline and a second processing pipeline, the second processing pipeline having an architecture that is different from an architecture of the first processing pipeline, causes the system to:
- manage, at a processing resource manager, the processing resources of the data processing system including the processor; and
- present to the processing resource manager each of the processing pipelines as an individual core.

* * * * *